(12) United States Patent
Sánchez y de la Camara

(10) Patent No.: US 6,309,688 B1
(45) Date of Patent: Oct. 30, 2001

(54) DIETETIC MAIZE TORTILLA

(76) Inventor: Felipe Alberto Sánchez y de la Camara, Iztaccihuatl #88 Casa "D"Col. Florida San Angel Delegación Alvaro Obregón, C.P. 01030, México, D.F. (MX)

( * ) Notice: Subject to any disclaimer, the term of this patent is extended or adjusted under 35 U.S.C. 154(b) by 0 days.

(21) Appl. No.: 09/297,021

(22) PCT Filed: Oct. 30, 1996

(86) PCT No.: PCT/MX97/00023

§ 371 Date: Apr. 23, 1999

§ 102(e) Date: Apr. 23, 1999

(87) PCT Pub. No.: WO98/18331

PCT Pub. Date: May 7, 1998

(30) Foreign Application Priority Data

Oct. 30, 1996 (MX) .................................................... 965229

(51) Int. Cl.$^7$ ............................ A21D 10/00; A21D 13/06
(52) U.S. Cl. ........................ 426/549; 426/496; 426/626; 426/622
(58) Field of Search .................................... 426/549, 496, 426/622, 626, 463

(56) References Cited

U.S. PATENT DOCUMENTS

| | | | |
|---|---|---|---|
| 4,594,260 | 6/1986 | Vaqueiro et al. | 426/622 |
| 5,532,013 | 7/1996 | Martinez-Bustos | 426/496 |
| 6,056,990 | * 5/2000 | Delrae et al. | 426/622 |

FOREIGN PATENT DOCUMENTS 176086   9/1994   (MX) .

* cited by examiner

*Primary Examiner*—Chhaya D. Sayala

(57) ABSTRACT

Dietary maize or corn tortilla and method for obtaining such tortilla, comprising first milling the grain and the pericarp of the maize separately, and then nixtamalizing them, also separately, and finally mixing in a proportion of 40–45:60–55 grain/pericarp until a homogeneous mass is obtained which is then taken to a conventional machine for producing tortillas. Such maize tortillas are obtained with the same traditional protein content 8–9%, with half of the fat 0.7–1%, and with the triple of fiber 6–9%, the latter due to the pericarp. They do not contain additives, they last much longer than conventional tortillas, their organoleptic characteristics are better and their resistance to tearing or breaking is higher.

2 Claims, No Drawings

DIETETIC MAIZE TORTILLA

BACKGROUND OF THE INVENTION

Centuries ago, the consumption of tortilla in our country has had a preferential place in the nourishment of our people.

There have been a lot of methods and technics for manufacturing it, so the milling and flooring industries have done, day by day, immeasurable efforts to render more efficient the production processes of nixtamal, dough, flour and finally the tortilla.

In all nixtamalization cases, the ingredients have always been whole corn grain, water, lime and temperature, preserving the nutritive elements that the grain contains, just increased as regards the food value through calcium ion contained in the lime.

In the traditional processes for producing it, there are the home or domestic nixtamalization, the nixtamalization performed in each mill of the named national milling industry, considered as a tradition in our country, which takes care of cooking the corn until obtaining the nixtamal, then grinding it in the typical stone mill converting the same into dough, to be later delivered to the tortilla shops, where warm tortillas are elaborated and offered to the consumer.

Our constant technical development since about 50 years ago, originated the national flour industry in Mexico, which takes care of cooking the corn and obtaining the nixtamal, grinding it this time in iron mills and drying it, obtaining a precooked flour, ready to be directly delivered to the tortilla shops, where flour and water are just mixed to obtain the dough with which the hot tortilla is elaborated and offered to the consumer in the same manner.

Afterwards, about five years ago as the supply needs changed, the tortilla manufacturers observed the need of providing their product permanently and without any time restriction or availability to the consuming public, they designed the first packed tortilla system, this time in cool condition, constantly available on displaying shelf with an average life of one hundred hours.

However, in order to achieve preserving the tortilla appropriately, according to the old fashioned nixtamalization technics, which were already installed, it was necessary to add large quantities of preserving materials, cohesive gums, carboxymethylcellulose, decolorating acids and a number of chemical products that were inconvenient and even toxic most the times, when consumed by human beings.

SUMMARY OF THE INVENTION

Following the new trends of modern nourishment and the most recent discoveries as regards human health, we have achieved a perfect nixtamalization, through a new technology that preserves the protein, reduces the fat, and increases the fiber, in a longer lasting tortilla and without any kind of chemical additives.

At first we have been able to grind the corn, cooking it then, separately doing the same thing with the corn pericarp or fiber, thereby allowing to increase the contact surface with the lime, until achieving a reaction essentially up to a 100% yield, later mixing the two cookings, being possible to obtain a homogeneous material having a pH between 8 and 9 without free radicals, which does not essentially require the addition of any chemical product for preserving it due to its alkaline condition, its duration being twice than any other material where the acid or alkaline conditions have been the object of variations or exposures to uncomplete reactions.

Because of this new technic, the broken corn grain may be profitable, which has been considered as impossible to be subjected to nixtamalization by the milling and flooring industries until now, in addition to the fact of taking advantage of the corn pericarp or fiber, which are at present thrown away by such important industries, which constitutes a novel utilization of materials considered as useless in every process for obtaining tortilla, complemented at the same time, just with water, lime and temperature.

EXAMPLE

The results, in an average of 25 tests performed with common tortillas from different factories, done with different kinds and varieties of corn, compared to those of this new technology, have been considered in the next table:

TABLE 1

| % | COMMON TORTILLA #1 | COMMON TORTILLA #2 | DIETETIC TORTILLA |
| --- | --- | --- | --- |
| Moisture | 51.5 | 49.0 | 50.1 |
| Protein | 8.5 | 8.9 | 8.6 |
| Fiber | 2.3 | 1.8 | 6.5 |
| Fat | 1.8 | 1.7 | 0.8 |
| Ash | 1.1 | 0.9 | 1.0 |
| Nitrogen Free Extract | 34.8 | 37.7 | 33.0 | in which is appreciated that the protein value is the same, that the fat has been reduced in a 50% and that the fiber is increased three more times than the normal value used up today.

DETAILED DESCRIPTION OF THE INVENTION

The invention consists in a dietetic corn tort with the same protein content than the common one, having 50% less fat and being richer in fiber three more times, it does not contain sugars, it has a usual carbohydrate level of low calorie content by coming from fibrous tissue, it highly enhances digestion and is fat chelant to make easier the elimination thereof, it has greater digestibility, much better flavour, smell or odor, organoleptic characteristics, flexibility and higher breaking resistance or strength when covering wet meals, it is completely free of preserving materials, cohesive gums, carboxymethylcellulose or chemical products of any kind, being slightly darker than the common tortilla because of its high fiber content, it can be preserved twice as long as any other tortilla known until now, and those physicochemical characteristics defines it as a dietetic product.

The process is based on reacting the ingredients by separate, first breaking and grinding the corn grain and separately grinding the corn pericarp or fiber to perform the nixtamalization, and then, taking into account their different reaction conditions, proportionally mixing them later, to obtain a homogeneous dough which will be used for manufacturing the tortilla.

The particular nixtamalization reaction is carried out under conditions very different than the ones used up to now, this means that the corn is first broken and grounded to a constant granulometry with such a fineness that 75% thereof as minimum passes through a sieve of 0.250 mm mesh screen opening, US-NOM No. 24 M-60, placing it aftewards in a cylindrical apparatus with movable lid and bottom, provided with rotating blades at a speed between 2 and 5 r.p.m. that shake the mixture, adding to it from 0.3 to 0.7% of lime, from 2 to 3 times its volume of water and applying a temperature at a range from 60 to 80 centigrade degrees, the optimal temperature being 70 grades in the mixture, carrying out this operation during a period of time of from twenty to thirty minutes without allowing that anything is lost or thrown away.

Invariably, stoichiometric amounts must be reacted so as not to leave any residue, cooking broth or remaining, which means a complete deletation of polluting wastes, as well as a complete profit of the materials used in the reaction.

On the other hand, the corn pericarp or fiber is grounded to the same granulometry, placing it later in the same cylindrical reactor apparatus with movable lid and bottom, also provided with blades that this time rotate at a speed between 6 and 9 r.p.m., but this time only from 0.2 to 0.4% of lime and from once to twice its volume of water will be added, applying a temperature within a range from 50 to 70 centigrades degrees, the optimal temperature being of 60 degrees in the mixture, maintaining this operation during a period of time from 10 to 20 minutes, which points out different nixtamalization conditions for each ingredient.

Afterwards blending of both materials already reacted in a proportion between 40–60 and 45–55 regarding corn pericarp will be performed, carrying out this operation in a specific machine for high precision dough mixing until obtaining a homogeneous result, taking it later to a common tortilla manufacturing machine, cooling the resultant tortillas in a filtered air fed band at room temperature and packing them, if their distribution is for displaying shelf or offering them in a warm condition if their distribution is for immediate consumption.

What is claimed is:

1. A dietetic corn tortilla having a protein content of between 8 and 9% by weight, and comprising fat in an amount of from 0.7 to 1% by weight, fiber from nixtamalized corn grain and pericarp in an amount of from 6 to 9% by weight, and from 30 to 33% by weight of carbohydrates having a calorie content derived from fibrous tissue, wherein the dietetic corn tortilla has no sugar.

2. A dietetic corn tortilla having a protein content of between 8 and 9% by weight, and comprising ground corn, fat in an amount of from 0.7 to 1% by weight, fiber from nixtamalized corn grain and pericarp in an amount of from 6 to 9% by weight, and from 30 to 33% by weight of carbohydrates, wherein the dietetic corn tortilla has no sugar.

* * * * *